Patented May 19, 1942

2,283,667

UNITED STATES PATENT OFFICE 2,283,667

MANUFACTURE OF NEW AZO DYESTUFFS

Wilfrid Herbert Cliffe, Blackley, Manchester, England, assignor to Imperial Chemical Industries Limited, a corporation of Great Britain No Drawing. Original application July 13, 1938, Serial No. 219,097. Divided and this application April 18, 1940. Serial No. 330,427. In Great Britain July 14, 1937

6 Claims. (Cl. 260—160)

This invention relates to new disazo dyestuffs and to their manufacture.

An object of the invention is to provide new disazo dyestuffs. A further object is to provide new disazo dyestuffs which are soluble in water. A further object is to provide new acid disazo dyestuffs suitable for wool and silk. A further object is to provide a process for the manufacture of such new disazo dyestuffs. Other objects will appear hereinafter.

The dyestuffs of the invention are water-soluble disazo dyestuffs and are obtained either by coupling tetrazotized diaminobenzoyl-N-benzyl anilides, as defined below, with two molecular proportions of the same or different coupling components, or by coupling a diazotized compound corresponding to the diamino-benzoyl-N-benzylanilides above mentioned, but having a nitro substituent in place of either but not both amino substituents, with one molecular proportion of a coupling component, reducing the nitro substituent to an amino substituent, diazotizing and then coupling with one molecular proportion of the same or a different coupling component.

The diamino benzoyl N-benzyl anilides referred to above are those of the formula:

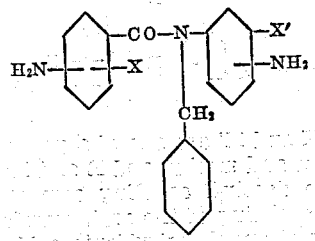

in which X and X' are hydrogen or methyl.

As coupling components I use alphanaphtholsulfonic acids, substituted aminonaphtholsulfonic acids, and arylpyrazolonesulfonic acids.

The new dyestuffs must contain a sufficiency of sulfonic acid groups to ensure that they are soluble in water. These sulfonic groups need to be originally present in one or more of the dyestuff components.

The diamino- or nitroaminobenzoyl-N-benzylanilides may be obtained by condensing a mononitro-N-benzylarylamine of the benzene series with a nitroaroyl chloride of the benzene series, and then reducing one or both nitro substituents.

The new dyestuffs dye wool from a neutral or acid bath and the resulting dyeings are characterized by very good fastness to washing, milling and light.

The invention will be understood by a consideration of the following examples (which are purely illustrative and not limiting), in which the parts are parts by weight.

Example 1

33.1 parts of 3:3′-diamino-6′-methylbenzoyl-N-benzylanilide are dissolved in a mixture of 62.5 parts of 36% aqueous hydrochloric acid and 600 parts of water and tetrazotized at 0°–5° C. with a solution of 17.2 parts of sodium nitrite in 125 parts of water. The tetrazo solution is then added gradually to an ice-cold solution containing 81 parts of the disodium salt of 1-acetyl-amino-8-naphthol-3:6-disulfonic acid and 50 parts of anhydrous sodium carbonate in 600 parts of water. Coupling is rapid and the dyestuff is salted out, filtered off and dried. The new dyestuff has, in the form of free acid, the formula:

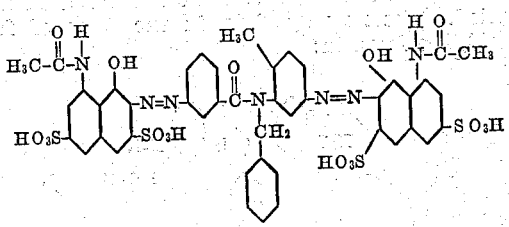

It is soluble in water. It dyes wool from an acid or neutral bath in bright bluish-red shades. The dyeings have very good fastness to washing, milling and light.

The 3:3′-diamino-6′-methylbenzoyl-N-benzylanilide, which is used above and is a new compound, is made as follows:

A solution containing 60.5 parts of 2-benzylamino-4-nitro-toluene and 46.4 parts of m-nitrobenzoyl chloride in 200 parts of toluene is boiled until interaction is complete. The 3:3′-dinitro-6′-methylbenzoyl-N-benzylanilide (M. P. 172–173°) which remains is reduced to the required diamine (M. P. 126°) by means of iron and hydrochloric acid in either water or ethyl alcohol.

Example 2

A tetrazo solution obtained as in Example 1 is added to a solution containing 61 parts of the sodium salt of 2-acetylamino-8-naphthol-6-sulfonic acid and 40 parts of anhydrous sodium carbonate in 800 parts of water. Coupling is rapid and the dyestuff is filtered off and dried. The dyestuff has, in the form of free acid, the formula:

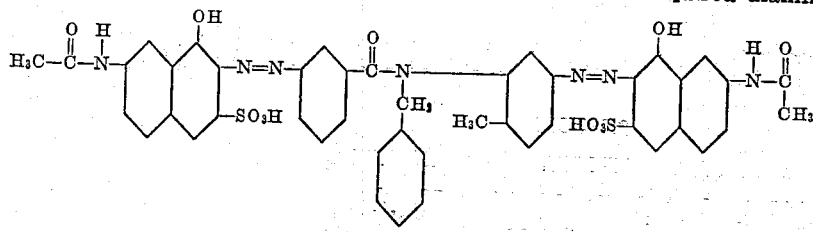

It is soluble in water. It dyes wool from an acid or neutral bath in bright scarlet shades. The dyeings have very good fastness to washing, milling, and light.

complete. The resulting 4:3'-dinitro-benzoyl-N-benzylanilide (M. P. 147° C.) is then reduced to the required diamine (M. P. 179° C.) by means of iron and hydrochloric acid in either water or ethyl alcohol.

Further dyestuffs obtained according to the invention are given in the following table:

| Example | Diazo component | Coupling component | Shade on wool |
|---|---|---|---|
| 4 | 1 mol. of 3:3'-diamino-6'-methylbenzoyl-N-benzylanilide | 2 mols. of 1-(2':5'-dichloro-4'-sulfophenyl)-3-methyl-5-pyrazolone. | Yellow. |
| 5 | do | 2 mols. of 2-acetylamino-5-naphthol-7-sulfonic acid | Orange-brown. |
| 6 | do | 2 mols. of 1-naphthol-4-sulfonic acid | Scarlet. |
| 7 | do | 2 mols. of 2-N-beta-hydroxy-ethylamino-8-naphthol-6-sulfonic acid. | Brown. |
| 8 | do | 2 mols. of 2-phenylamino-8-naphthol-6-sulfonic acid | Brown. |
| 9 | do | 2 mols. of 1-benzoylamino-8-naphthol-4:6-disulfonic acid | Red. |
| 10 | 1 mol. of 4:3'-diamino-benzoyl-N-benzylanilide | 2 mols. of 1-naphthol-4-sulfonic acid | Scarlet. |
| 11 | do | 2 mols. of 2-phenylamino-8-naphthol-6-sulfonic acid | Brown. |
| 12 | do | 2 mols. of 2-phenylamino-8-naphthol-6-sulfonic acid | Brown. |

Example 3

41.8 parts of 3:4'-diamino-4-methylbenzoyl-N-benzylanilide are dissolved in a mixture of 62.5 parts of 36% aqueous hydrochloric acid and 600 parts of water and tetrazotized at 0-5° C. with a solution of 17.2 parts of sodium nitrite in 125 parts of water. The tetrazo solution is then added gradually to an ice-cold solution which contains 63.6 parts of 1-(4'-sulfophenyl)-3-methyl-5-pyrazolone and 40 parts of anhydrous sodium carbonate in 800 parts of water. When coupling is complete the dye is salted out, filtered off and dried. The new dye has, in the form of free acid, the formula:

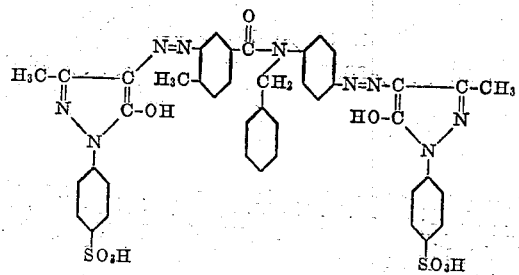

It is soluble in water and dyes wool from an acid or neutral bath in yellow shades of very good fastness to washing and milling.

The 3:4'-diamino-4-methylbenzoyl-N-benzylanilide which is used above is a new compound, which is made as follows: A solution of 68.4 parts of 4-nitro-N-benzylaniline and 60 parts of 3-nitro-4-methylbenzoyl chloride in 250 parts of toluene is boiled until the reaction is complete. The resulting 3:4'-dinitro-4-methylbenzoyl-N-benzylanilide (M. P. 154° C.) is then reduced to the required diamine (M. P. 157° C.) with iron and hydrochloric acid in either water or ethyl alcohol.

4:3'-diaminobenzoyl-N-benzylanilide is a new compound and is made as follows: A solution containing 68.4 parts of 3-nitro-N-benzylaniline and 55.8 parts of p-nitrobenzoyl chloride in 450 parts of toluene is boiled until the reaction is As many apparently widely different embodiments of this invention may be made without departing from the spirit and scope thereof, it is to be understood that I do not limit myself to the specific embodiments thereof except as defined in the appended claims.

This application is a division of U. S. application Serial No. 219,097, filed July 13, 1938, U. S. Patent No. 2,216,229, issued October 1, 1940.

I claim:

1. The compounds represented by the formula:

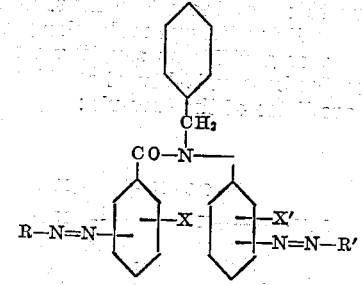

in which X and X' are one of a group consisting of hydrogen and methyl and R and R' are water soluble azo dyestuff coupling components from the class consisting of the arylpyrazolonesulfonic acid and alphanaphtholsulfonic acid series.

2. The compounds represented by the formula:

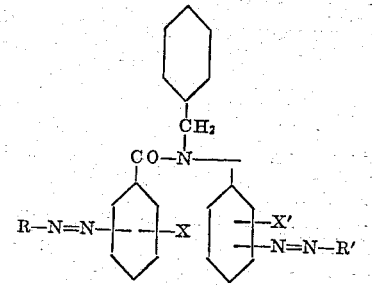

in which X and X' are one of a class consisting of hydrogen and methyl and R and R' are water-soluble azo dyestuff coupling components of the aryl pyrazolonesulfonic acid series.

3. The compounds represented by the formula:
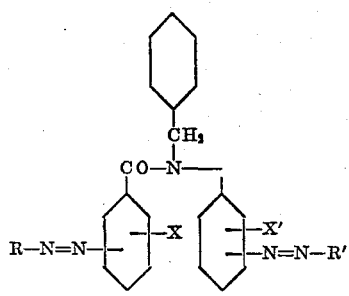
in which X and X' are one of a group consisting of hydrogen and methyl and R and R' are water soluble azo dyestuff coupling components of the alpha naphthol sulfonic acid series.
4. The compound represented by the formula:
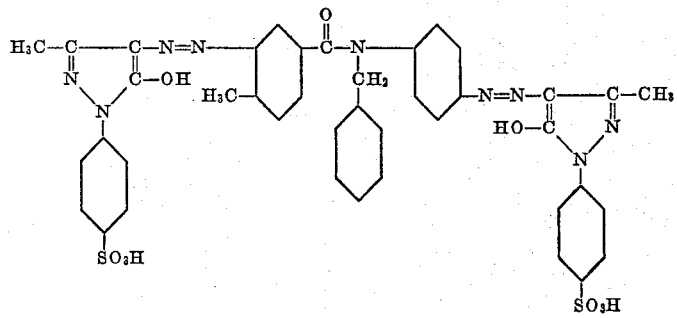
5. The compound represented by the formula:
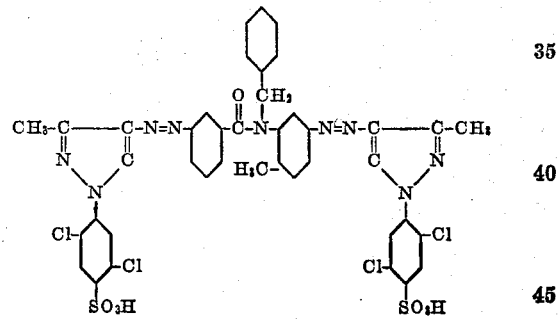
6. The compound represented by the formula:
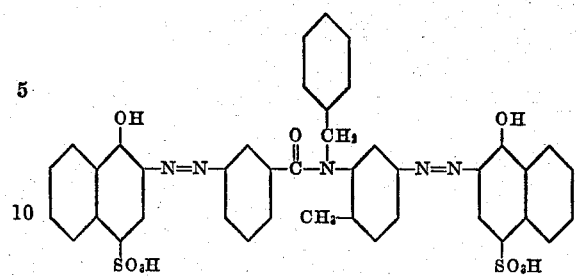
WILFRID H. CLIFFE.